US 11,731,567 B2

(12) United States Patent
Cruz

(10) Patent No.: US 11,731,567 B2
(45) Date of Patent: Aug. 22, 2023

(54) SENSOR ASSEMBLIES AND OBJECT DETECTION IN VEHICLES

(71) Applicant: Nissan North America, Inc., Franklin, TN (US)

(72) Inventor: Arturo Cruz, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 33 days.

(21) Appl. No.: 17/161,218

(22) Filed: Jan. 28, 2021

(65) Prior Publication Data

US 2022/0234515 A1    Jul. 28, 2022

(51) Int. Cl.
 *B60R 11/00* (2006.01)
 *B62D 65/02* (2006.01)
 *B62D 25/10* (2006.01)
 *B60R 19/02* (2006.01)
 *G01S 13/931* (2020.01)

(52) U.S. Cl.
 CPC ............ *B60R 11/00* (2013.01); *B62D 65/024* (2013.01); *B60R 19/023* (2013.01); *B62D 25/10* (2013.01); *B62D 25/105* (2013.01); *G01S 13/931* (2013.01)

(58) Field of Classification Search
 CPC . B60R 11/00; B60R 19/023; B60R 2011/004; B60R 2011/0042; B62D 65/024; B62D 25/10; B62D 25/105; B62D 25/18; G01S 13/931
 USPC ...................................... 296/198, 76, 187.11
 See application file for complete search history.

(56) References Cited

U.S. PATENT DOCUMENTS

| | | | |
|---|---|---|---|
| 6,317,202 B1* | 11/2001 | Hosokawa | G01S 17/42 180/169 |
| 6,508,325 B1* | 1/2003 | Schwarz | B60Q 9/008 293/4 |
| 9,777,518 B2* | 10/2017 | Warschat | G01S 17/931 |
| 11,203,313 B2* | 12/2021 | Momii | G01S 7/027 |
| 11,220,222 B2* | 1/2022 | Kitagawa | B60R 19/483 |
| 2016/0291151 A1* | 10/2016 | Dechoux | B60R 19/483 |
| 2017/0186323 A1* | 6/2017 | Atkin | G06V 20/58 |
| 2017/0332010 A1* | 11/2017 | Asakura | G05D 1/027 |
| 2017/0341611 A1* | 11/2017 | Baker | B60R 21/16 |
| 2018/0052236 A1* | 2/2018 | Hoffman, Jr. | B60R 11/00 |
| 2019/0162845 A1 | 5/2019 | Yasui | |
| 2021/0031701 A1* | 2/2021 | Kitagawa | G01S 13/931 |
| 2021/0148737 A1* | 5/2021 | Yamaji | G01S 13/931 |
| 2021/0229754 A1* | 7/2021 | Shibata | B62D 25/18 |

FOREIGN PATENT DOCUMENTS

| | | |
|---|---|---|
| CN | 100565240 C | 12/2009 |
| DE | 4333066 A1 | 3/1995 |
| DE | 102014109797 A1 | 1/2016 |
| EP | 1460391 A1 | 9/2004 |
| GB | 2512440 B | 6/2016 |
| JP | 4075733 B2 | 4/2008 |

(Continued)

*Primary Examiner* — Pinel E Romain
(74) *Attorney, Agent, or Firm* — Young Basile Hanlon & MacFarlane, P.C.

(57) ABSTRACT

A vehicle is disclosed that includes a vehicle body and at least one sensor assembly that is supported on the vehicle body. The at least one sensor assembly is configured to detect an external object and includes a housing portion and a sensor that is supported within the housing portion such that the sensor is oriented at a fixed (e.g., downward) angle.

20 Claims, 5 Drawing Sheets

(56) References Cited

FOREIGN PATENT DOCUMENTS

| | | | |
|---|---|---|---|
| JP | 4678497 B2 | 4/2011 | |
| JP | 4839587 B2 | 12/2011 | |
| JP | 2021079737 A * | 5/2021 | ............. B62D 25/02 |
| KR | 200305104 Y1 | 2/2003 | |
| KR | 100676447 B1 | 1/2007 | |

* cited by examiner

SENSOR ASSEMBLIES AND OBJECT DETECTION IN VEHICLES

TECHNICAL FIELD

The present disclosure relates to vehicle sensor assemblies. More specifically, the present disclosure describes sensor assemblies that are supported at an angle in relation to a vehicle's longitudinal axis (length) to improve object detection.

BACKGROUND

Conventionally, sensor assemblies are oriented in parallel relation to a vehicle's longitudinal axis (length), which may impede the close-range detection of external objects.

To address this concern, the present disclosure describes sensor assemblies that are angled in relation to a vehicle's longitudinal axis, which improves sensing and the detection of external objects.

SUMMARY

In one aspect of the present disclosure, a vehicle is disclosed that includes a vehicle body and at least one sensor assembly that is supported on the vehicle body. The at least one sensor assembly is configured to detect an external object and includes a housing portion and a sensor that is supported within the housing portion such that the sensor is oriented at a fixed (e.g., downward) angle.

In certain embodiments, the at least one sensor assembly may be supported on a rear end portion of the vehicle.

In certain embodiments, the vehicle may further include a rear bumper.

In various embodiments, the at least one sensor assembly may be supported on or vertically above the rear bumper (e.g., on the vehicle's trunk lid).

In certain embodiments, the at least one sensor assembly may be supported on the vehicle body such that the fixed, downward angle lies substantially within a range of (approximately) 15° to (approximately) 45°. For example, it is envisioned that the fixed, downward angle may be (approximately) 30°.

In certain embodiments, the at least one sensor assembly may include a first sensor assembly that is spaced from a first lateral (side) end of the vehicle and a second sensor assembly that is spaced from a second lateral end (side) of the vehicle.

In certain embodiments, the first sensor assembly may be spaced a first distance from the first lateral end of the vehicle and the second sensor assembly may be spaced a second distance from the second lateral end of the vehicle.

In certain embodiments, the first distance and the second distance may be (approximately) equivalent.

In certain embodiments, the at least one sensor assembly may further include a third sensor assembly that is spaced between the first sensor assembly and the second sensor assembly and a fourth sensor assembly that is spaced between the second sensor assembly and the third sensor assembly.

In certain embodiments, the at least one sensor assembly may further include a retaining member that extends laterally outward from the housing portion and a collar that is supported adjacent to an end of the housing portion.

In certain embodiments, the retaining member and the collar may define a receiving space therebetween that is configured to receive the vehicle body such that the vehicle body is located between the retaining member and the collar to thereby secure the at least one sensor assembly in relation to the vehicle body.

In certain embodiments, the at least one sensor assembly may include an indicator to facilitate proper orientation of the at least one sensor assembly in relation to the vehicle body during installation.

In certain embodiments, the housing portion may define an opening that is configured to receive a locking member to further secure the at least one sensor assembly in relation to the vehicle body.

In another aspect of the present disclosure, a vehicle is disclosed that includes a vehicle body and at least one sensor assembly that is supported on the vehicle body. The at least one sensor assembly includes a housing portion and a sensor that is supported within the housing portion. The housing portion includes a trunk that extends along a first axis and a receptacle that extends into the trunk along a second axis, wherein the second axis is oriented at a fixed angle in relation to the first axis. The sensor is configured to detect an external object and is supported within the receptacle.

In certain embodiments, the receptacle may extend into the trunk such that the fixed angle is (approximately) 30°.

In certain embodiments, the at least one sensor assembly may include a plurality of sensor assemblies that are spaced (approximately) equidistant from each other.

In certain embodiments, the at least one sensor assembly may be supported on a rear end portion of the vehicle.

In certain embodiments, the at least one sensor assembly may further include a deflectable retention member that extends laterally outward from the housing portion and a collar that is supported adjacent to an end of the housing portion.

In certain embodiments, the vehicle body may be received between the deflectable retention member and the collar during installation of the at least one sensor assembly to thereby secure the at least one sensor assembly in relation to the vehicle body.

In another aspect of the present disclosure, a method of installing at least one sensor assembly in a vehicle is disclosed that includes inserting at least one sensor assembly into an opening in a body of the vehicle such that the at least one sensor assembly defines a sensing axis fixedly oriented in non-parallel relation to a longitudinal axis of the vehicle.

In certain embodiments, inserting the at least one sensor assembly into the opening may include inserting the at least one sensor assembly such that the sensing axis is oriented downwardly so as to define an angle with the longitudinal axis substantially within a range of (approximately) 15° to (approximately) 45°.

In certain embodiments, inserting the at least one sensor assembly into the opening may include supporting the at least one sensor assembly on a rear end portion of the vehicle.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
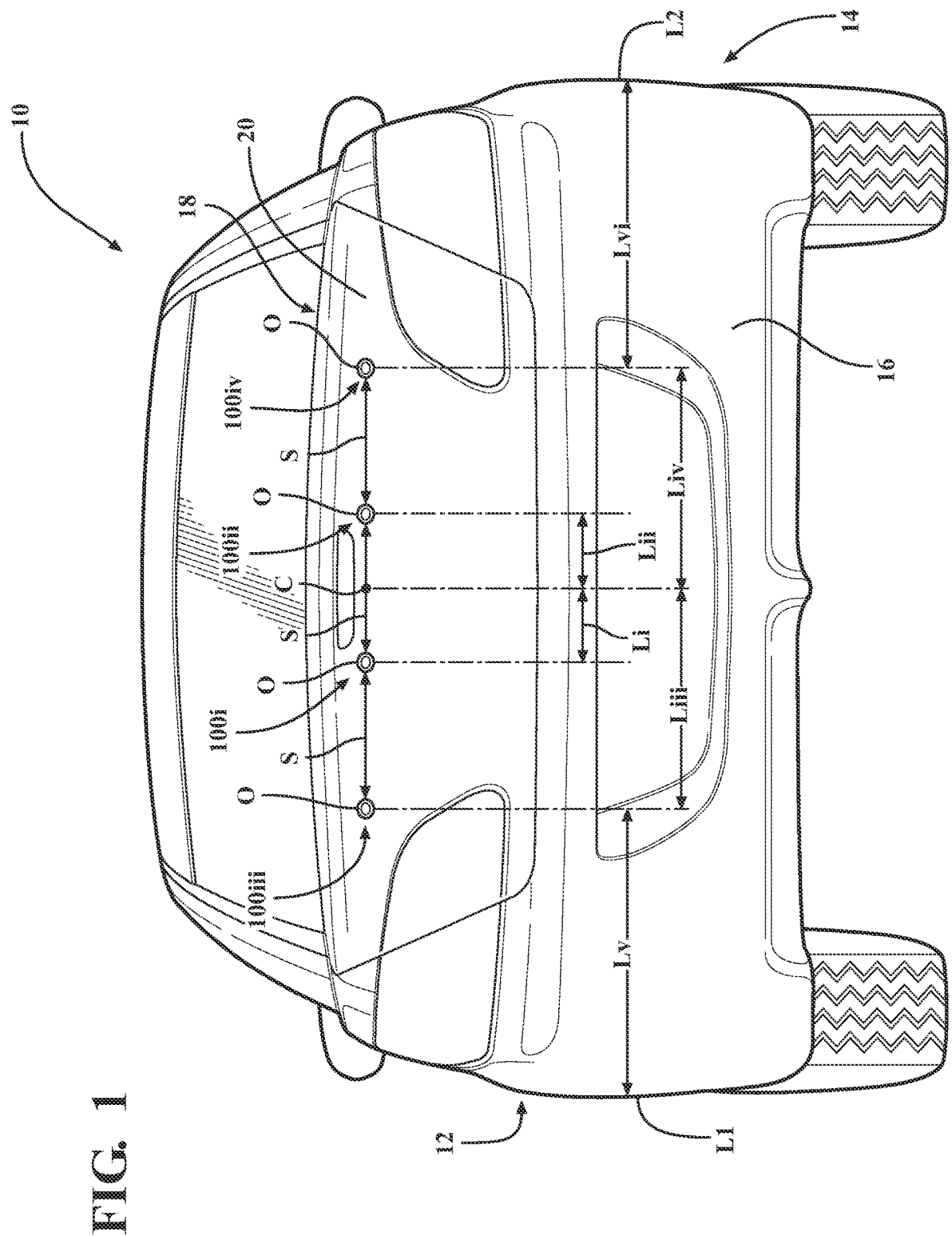
FIG. 1 is a rear, plan view illustrating a plurality of sensor assemblies supported on a vehicle according to the principles of the present disclosure.

The present disclosure describes sensor assemblies that are configured to improve the detection of close-range external objects as well as vehicles that include such sensor assemblies. More specifically, the present disclosure describes sensor assemblies defining a detection axis that is oriented at a (downward) angle in relation to the longitudinal axis (length) of the vehicle, which alters the detection area to facilitate the detection of external objects located in close proximity to the vehicle. Throughout the present disclosure, the term "downward" should be understood as referring to an orientation that is angled towards the ground and/or a lower portion of the vehicle while the term "upward" should be understood as referring to an orientation that is angled away from the ground and towards an upper portion of the vehicle. Additionally, the terms "supported," "secured," and "mounted" (and variations thereof) may be used interchangeably throughout the present disclosure and should each be understood as referring to a physical connection between the pertinent structures and/or components.

The sensor assemblies described herein may be supported on a vehicle in any suitable location (e.g., on a front or rear bumper, on the trunk lid, on the vehicle's grille, etc.) and include a housing portion and a sensor that is supported within the housing portion. The housing portion includes a trunk that extends along a first axis oriented in (generally) parallel relation to the vehicle's longitudinal axis (upon installation) and a receptacle that extends into the trunk. The receptacle is configured to accommodate (receive) the sensor and extends along a second axis that is oriented at a fixed (e.g., downward) angle in relation to the first axis.

With reference now to the figures, a vehicle 10 (FIG. 1) is disclosed that includes a vehicle body 12 defining a longitudinal axis Y (FIG. 3) that extends along (is parallel in relation to) the length of the vehicle 10. The vehicle body 12 includes a front end portion (not shown) with a front bumper and a rear end portion 14 with a rear bumper 16 and a trunk lid 18. Although (generally) illustrated as a passenger coupe throughout the figures, it should be appreciated that the particular configuration of the vehicle 10 may be altered in various embodiments without departing from the scope of the present disclosure. For example, it is envisioned that the vehicle 10 may be configured as a sedan, a pickup truck, a stake body vehicle, a cargo van, a motorcycle, a boat, a commercial vehicle (e.g., a bus, a forklift, or the like), etc.

The vehicle 10 includes one or more sensor assemblies 100 that are configured to detect (e.g., observe, identify, etc.) an external object and/or measure the longitudinal (axial) distance between the vehicle 10 and the external object. Although generally discussed in the context of a sonar-based system, it is envisioned that the principles of the present disclosure and the structures and methods described herein below may find wide applicability to a broad range of sensing technologies, whether presently known or later developed.

In the particular embodiment of the disclosure seen in FIG. 1, the sensor assemblies 100 are illustrated as being supported on (e.g., mounted, secured to) the rear end portion 14 of the vehicle body 12. More specifically, the sensor assemblies 100 are supported on an upper section 20 of the trunk lid 18 such that the sensor assembl(ies) 100 are located vertically above the rear bumper 16. It should be appreciated, however, that the location of the sensor assembl(ies) 100 may be altered in various embodiments without departing from the scope of the present disclosure. For example, it is envisioned that the sensor assembl(ies) 100 may be supported on a lower section of the trunk lid 18, on the rear bumper 16, on the front end portion (not shown) of the vehicle 10 (e.g., on the front bumper, the front grille, etc.), on a side of the vehicle 10 (e.g., on either or both of side view mirrors), or in any other location(s) suitable for the intended purpose of improving the detection of external objects.

In the particular embodiment of the disclosure seen in FIG. 1, the vehicle 10 is illustrated as including four (e.g., first, second, third, and fourth) sensor assemblies 100$i$, 100$ii$, 100$iii$, 100$iv$. The sensor assemblies 100$i$-100$iv$ are spaced outwardly of a (horizontal) centerpoint C of the vehicle body 12 (e.g., the trunk lid 18) by lateral distances Li-Liv, respectively. More specifically, the sensor assemblies 100$i$, 100$iii$ and the sensor assemblies 100$ii$, 100$iv$ are positioned on opposite sides of the center point C such that the sensor assembly 100$i$ is located between the sensor assemblies 100$ii$, 100$iii$ and the sensor assembly 100$ii$ is located between the sensor assemblies 100$i$, 100$iv$, whereby the sensor assemblies 100$iii$, 100$iv$ are spaced inwardly of opposing (first and second) lateral ends (sides) L1, L2 of the vehicle body 12 by (first and second) lateral distances Lv, Lvi, respectively.

Depending upon the particular model and/or configuration of the vehicle 10, the particular mounting location of the sensor assemblies 100, spatial allowances of the mounting location, the desired aesthetic appearance, etc., in various embodiments of the disclosure, it is envisioned that the location and/or the number of sensor assemblies 100 included on the vehicle 10 may be varied. For example, in the particular embodiment illustrated, the sensor assemblies 100$i$-100$iv$ are positioned such that adjacent sensor assemblies 100 are spaced (approximately) equidistant from each other by a distance S and such that the lateral distances Lv, Lvi are (approximately) equivalent. More specifically, the sensor assemblies 100$i$-100$iv$ are positioned such that the distance S lies substantially within the range of (approximately) 20 cm to (approximately) 60 cm (e.g., (approximately) 40 cm). Embodiments in which the distance S between adjacent sensor assemblies 100 may lie outside of this range, however, are also contemplated herein, as are embodiments in which the lateral distances Lv, Lvi may vary from each other. The present disclosure also envisions embodiments in which the number of sensor assemblies 100 included on the vehicle 10 may be increased or decreased. For example, it is envisioned that the vehicle V may include a single sensor assembly 100, a single pair of sensor assemblies, three pairs of sensor assemblies, etc.

Figure 2:
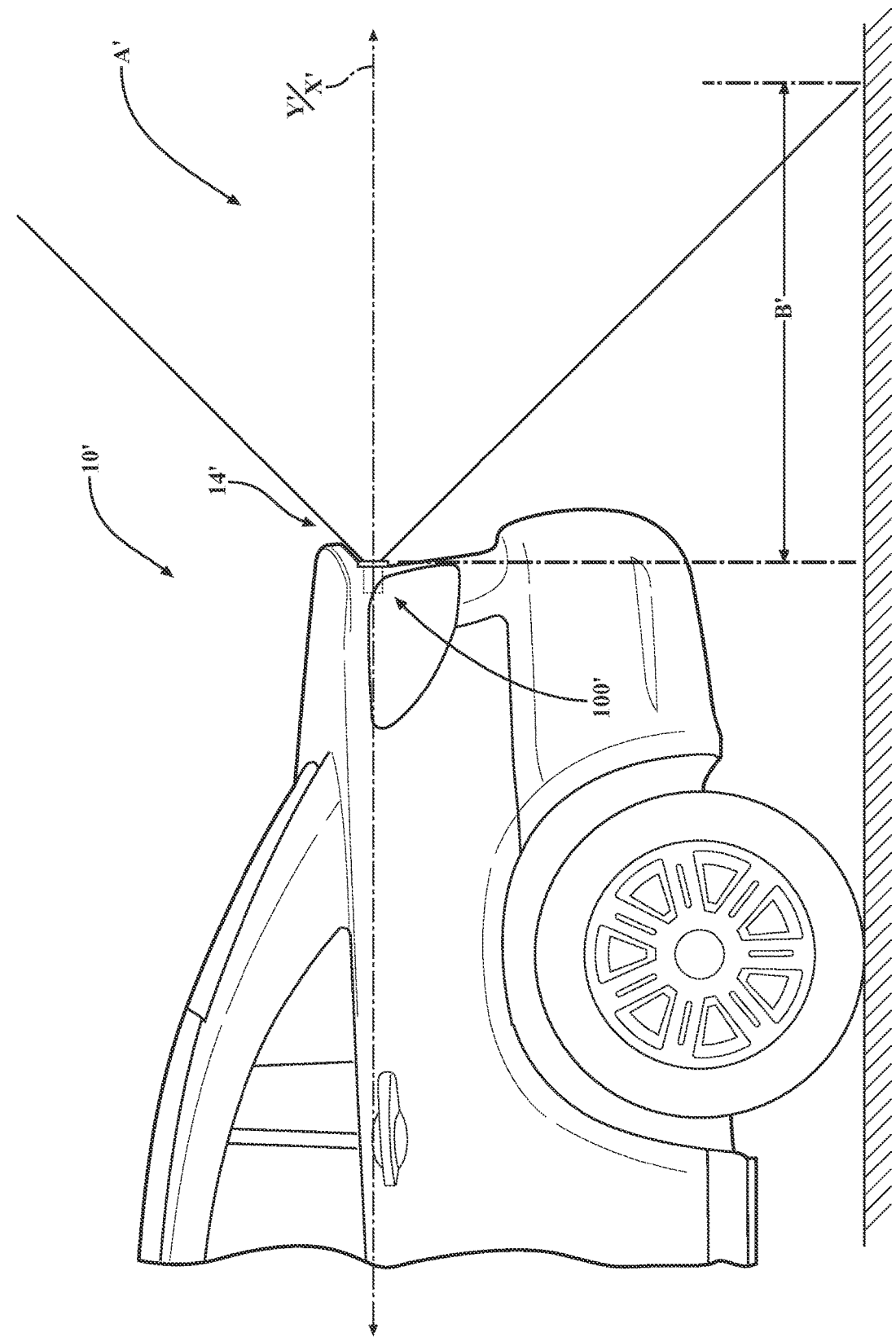
FIG. 2 is a partial, side, plan view of a vehicle and a known sensor assembly that is mounted such that the sensing axis is (approximately) aligned with a longitudinal axis (length) of the vehicle.
Figure 3:
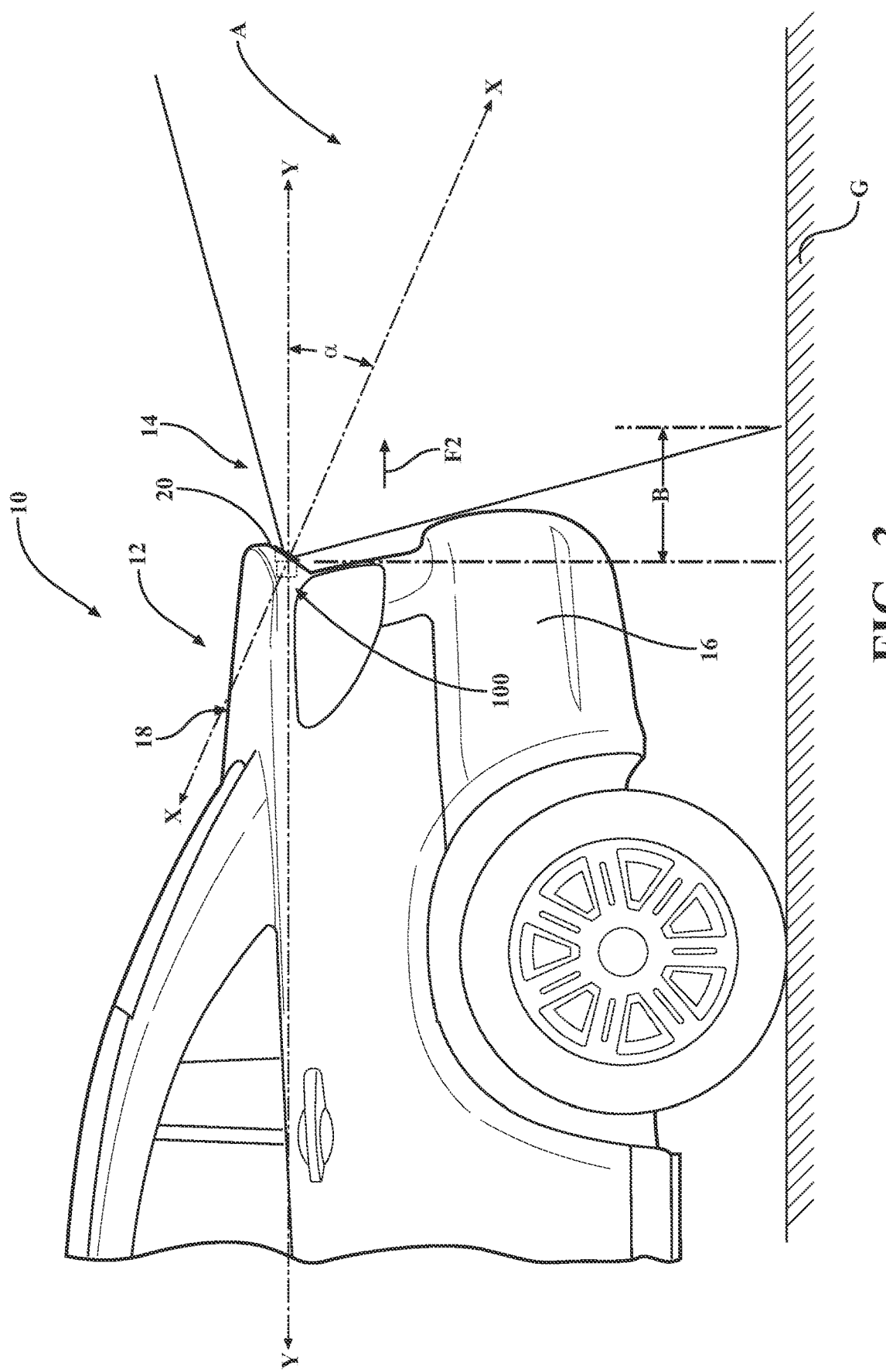
FIG. 3 is a partial, side, plan view of the vehicle and the sensor assemblies seen in FIG. 1 illustrating an angular offset between the sensing axis and the longitudinal axis of the vehicle.

With reference now to FIGS. 2 and 3 as well, a conventional vehicle 10' (FIG. 2) is illustrated that includes one or more known sensor assemblies 100'. The vehicle 10' is identical to the vehicle 10 discussed above, except for the configuration and orientation of the sensor assemblies 100', as elaborated upon below.

Each sensor assembly 100' defines a detection area A' and is supported on (mounted to) the vehicle 10' such that a sensing (central, detection) axis X' defined by the sensor assembly 100' (e.g., an axis bisecting the detection area A') is (generally) aligned with the longitudinal axis Y' of the vehicle 10'. This arrangement, however, results in spacing of the detection area A' from the mounting location of the sensor assembl(ies) 100' (e.g., the rear end portion 14' of the vehicle 10) by an axial (longitudinal) distance B'.

In contrast, as seen in FIG. 3, the sensor assembl(ies) 100 that are the subject of the present disclosure are supported on (secured to) the vehicle 10 in an angled orientation. More specifically, each sensor assembly 100 defines a detection area A and a sensing (central, detection) axis X, which bisects the detection area A, that is out of alignment with the longitudinal axis Y of the vehicle 10. Each sensor assembly 100 is configured and mounted so as to defined an angle α between the sensing axis X and the longitudinal axis Y that lies substantially within the range of (approximately) 15° to (approximately) 45° (e.g., (approximately) 30°). Depending on the particular mounting location of the sensor assembl(ies) 100, however, it is envisioned that the angle α may be altered by varying the configuration and/or mounting of each sensor assembly 100. For example, the angle α may be increased when the sensor assembl(ies) 100 are mounted at more elevated locations or decreased when the sensor assembl(ies) 100 are mounted at less elevated locations. It should also be appreciated that the sensor assembl(ies) 100 may be configured and mounted so as to define values for the angle α that lie outside of the aforementioned range and that such alternate embodiments would not be beyond the scope of the present disclosure. Additionally, while generally illustrated and described herein as being angled downwardly (e.g., towards the ground G), it is also envisioned that the sensor assembl(ies) 100 may be angled upwardly (e.g., away from the ground G) in alternate embodiments of the disclosure.

As can be appreciated through comparative reference to FIGS. 2 and 3, the downward angle α of the sensor assembl(ies) 100 reduces the distance B between the mounting location (e.g., the rear end portion 14 of the vehicle 10) and the detection area A (when compared to the distance B' (FIG. 2)), thereby improving sensing and the detection of external objects.

Figure 4:
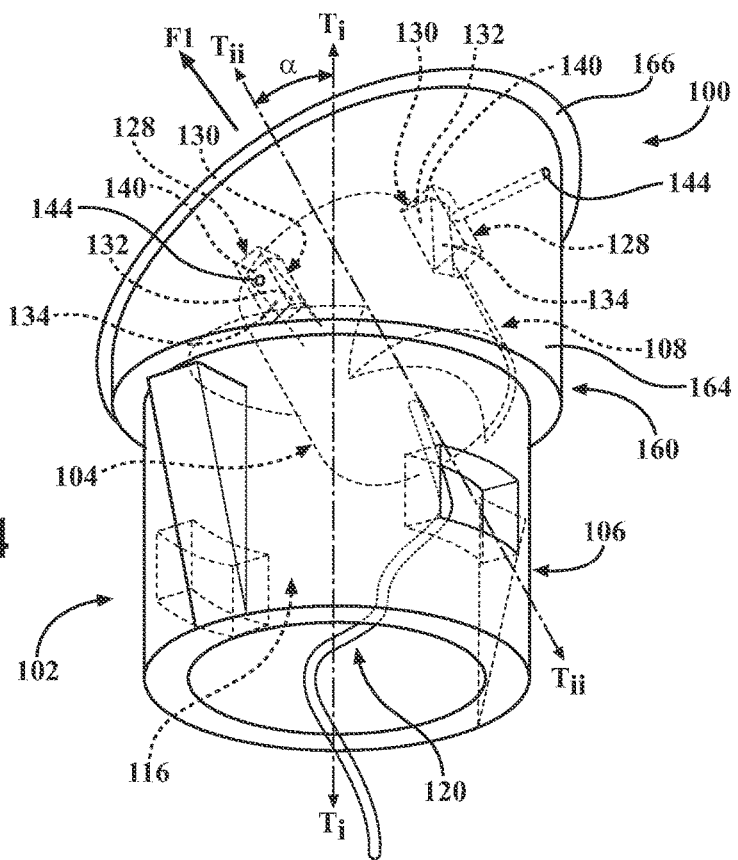
FIG. 4 is a top, perspective, view of a sensor assembly according to the principles of the present disclosure illustrating the connection of a wiring harness.

Referring now to FIGS. 4-8, each sensor assembly 100 includes a housing portion 102 and a sensor 104 that is supported within the housing portion 102. The housing portion 102 includes a trunk (body portion) 106 and a receptacle 108 that extends into the trunk 106 and is configured to receive (accommodate) the sensor 104 such that external objects are detectable by the sensor 104 through a window 110 (FIG. 5) in the housing portion 102. As seen in FIG. 4, the trunk 106 extends along (defines) a first (central) axis Ti and the receptacle 108 extends along (defines) a second (central) axis Tii that is arranged in transverse relation to the first axis Ti (e.g., such that the axes Ti, Tii intersect) so as to subtend the aforementioned (downward) angle α therebetween.

The housing portion 102 includes an operative (functional) end 112 defining an end face 114. The end face 114 is arranged in transverse relation to the axes Ti, Tii and a reference axis R (FIG. 6) that extends in orthogonal relation to the axis Ti, which facilitates insertion of the sensor 104 (FIG. 4) into the receptacle 108. More specifically, the end face 114 extends along an axis E so as to subtend an angle β with the reference axis R that is (approximately) equivalent to the angle α.

Due to the non-parallel relationship between the axes Ti, Tii, the housing portion 102 defines an overall outer transverse cross-sectional dimension (e.g., a diameter) D larger than that defined by known sensor assemblies, such as the sensor assembly 100' seen in FIG. 2. For example, whereas the sensor assembly 100' may define an overall outer transverse cross-sectional dimension that lies substantially within the range of (approximately) 20 mm to (approximately) 23 mm (e.g., (approximately) 22.5 mm), it is envisioned that the overall outer transverse cross-sectional dimension D defined by the sensor assembly 100 may lie substantially within the range of (approximately) 23 mm to (approximately) 26 mm (e.g., (approximately) 24.5 mm). Embodiments in which the overall outer transverse cross-sectional dimension D may lie outside of this range, however, are also contemplated herein and would not be beyond the scope of the present disclosure.

The housing portion 102 may include (e.g., may be formed partially or entirely from) any suitable material or combination of materials and may be formed through any suitable method of manufacture (e.g., injection molding, casting, laser machining, etc.). For example, it is envisioned that the housing portion 102 may include (e.g., may be formed partially or entirely from) a plastic material, such as Acrylonitrile Butadiene Styrene (ABS). Additionally, or alternatively, it is envisioned that the housing portion 102 may include one or more shock-absorbent materials to dampen vibration (e.g., to increase the accuracy and/or reliability of object detection).

In the particular embodiment of the disclosure illustrated throughout the figures, the housing portion 102 is unitary in construction (e.g., is integrally or monolithically formed). The unitary construction of the housing portion 102 fixes the relative orientation of the axes Ti, Tii (FIG. 4) as well as the relative orientation of the sensing axis X (FIG. 3) in relation to the longitudinal axis Y of the vehicle 10, thereby fixing the (downward) angle α of each sensor 104 upon installation of the corresponding sensor assembly 100 such that the sensing axis X is oriented in non-parallel relation to the longitudinal axis Y.

The trunk 106 of the housing portion 102 defines an open interior region 116 (e.g., a cavity 118) that extends in generally parallel relation to the axis Ti defined by the trunk 106. The open interior region 116 is configured to receive a wiring harness 120 (FIG. 4) to facilitate (electrical) connection of the sensor assembly 100 to the vehicle 10. The trunk 106 defines a shoulder (shelf) 122 that extends radially inwardly into the open interior region 116. The shoulder 122 defines an inner (lower) end 124 of the receptacle 108 and provides a support 126 for the sensor 104 upon insertion into the receptacle 108. The shoulder 122 is generally arcuate in configuration and spans a distance (e.g., an arc length) that lies substantially within the range of (approximately) 75° to (approximately) 105°. For example, it is envisioned that the shoulder 122 may span a distance (e.g., an arc length) of (approximately) 90°. Embodiments in which the distance (arc length) spanned defined by the shoulder 122 may lie outside of this range, however, are also contemplated herein and would not be beyond the scope of the present disclosure.

The receptacle 108 (FIG. 4) is generally cylindrical in configuration and, as indicated above, is configured to receive the sensor 104. It is envisioned that sensor 104 may be received within the receptacle 108 in either a fixed or removable manner. For example, it is envisioned that the sensor 104 may be secured within the receptacle 108 via an adhesive (or other such fixed connection). Alternatively, the receptacle 108 may define one or more recesses 128 that are configured to receive one or more corresponding retaining members (anchors) 130 that extend laterally (e.g., radially) outward from the sensor 104. For example, in the particular embodiment of the disclosure, the receptacle 108 is illustrated as including four recesses 128 that are separated from each other by (approximately) 90° (e.g., such that the recesses 128 are spaced (approximately) equidistant from each other) and the sensor 104 is illustrated as including four corresponding retaining members 130 that are spaced accordingly. Embodiments in which the number and/or the location of the recesses 128 and the retaining members 130 may be varied are also contemplated herein, however, and would not be beyond the scope of the present disclosure.

In the particular embodiment of the disclosure illustrated throughout the figures, the retaining member(s) 130 are illustrated as tab(s) 132 that are resilient in construction, which allows for reconfiguration of the retaining member(s) 130 between an expanded (first, initial, normal) configuration and a compressed (second, subsequent) configuration. It is envisioned that resiliency of the retaining member(s) 130 may be achieved through the incorporation of one or more compressible materials (e.g., rubber materials, polymeric materials, elastomeric materials, etc.) and/or the incorporation of one or more compressible biasing members (e.g., springs or the like).

Upon the application of an external force, such as that applied by the housing portion 102 during insertion of the sensor 104 into the receptacle 108, the retaining member(s) 130 are compressed (deflected inwardly) and move towards the axis Tii. To facilitate inward deflection of the retaining member(s) 130 during insertion of the sensor 104 into the receptacle 108, it is envisioned that the retaining member(s) 130 may include chamfered (angled) radial surfaces 134 that are configured for contact with the housing portion 102 (e.g., with a rim 136 (FIG. 5) and/or an inner wall 138 (FIG. 7) of the receptacle 108). During insertion of the sensor 104 into the receptacle 108, the chamfered radial surfaces 134 bear against the housing portion 102, which causes compression (inward deflection) of the retaining member(s) 130.

Upon complete insertion of the sensor 104 into the receptacle 108, the retaining member(s) 130 are aligned with the recesses 128 (along the axis Tii), at which time, the resilient construction of the retaining member(s) 130 allows for outward movement of the retaining member(s) 130 (away from the axis Tii) towards the expanded configuration. As the expanded configuration is (partially or completely) restored, the retaining member(s) 130 expand into the recesses 128, thereby securing the sensor 104 within the receptacle 108.

In certain embodiments, as mentioned above, it is envisioned that the sensor 104 may be removable from the housing portion 102 (e.g., to facilitate repair or replacement of the sensor 104). In such embodiments, it is envisioned that, during removal of the sensor 104, the retaining member(s) 130 may be moved towards the compressed configuration via the application of a withdrawal force F1 (FIG. 4). To facilitate inward deflection of the retaining member(s) 130 during removal of the sensor 104 from the receptacle 108, it is envisioned that the retaining member(s) 130 may include chamfered (angled) upper surfaces 140 that are configured for contact with the upper walls 142 (FIG. 7) defined by the recesses 128. During removal of the sensor 104 from the receptacle 108, the chamfered upper surfaces 140 bear against the upper walls 142, which causes compression (inward deflection) of the retaining member(s) 130.

Additionally, or alternatively, in certain embodiments, it is envisioned that the housing portion 102 may include a series of openings 144 (FIGS. 4, 6) that extend from the recesses 128 through the housing portion 102 and are configured to receive a tool (not shown) such that the retaining member(s) 130 may be manually compressed upon the application of a force thereto via the tool to thereby facilitate removal of the sensor 104.

Figure 5:
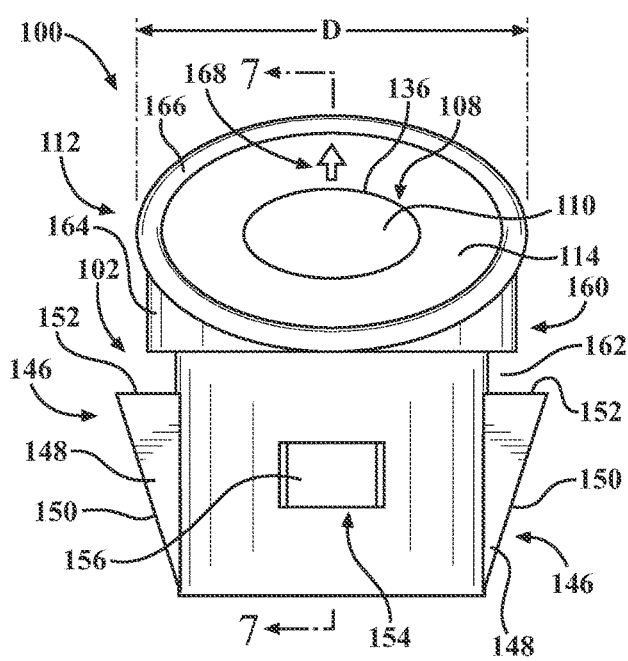
FIG. 5 is bottom, plan view of the sensor assembly seen in FIG. 4 shown separated from the vehicle.
Figure 6:
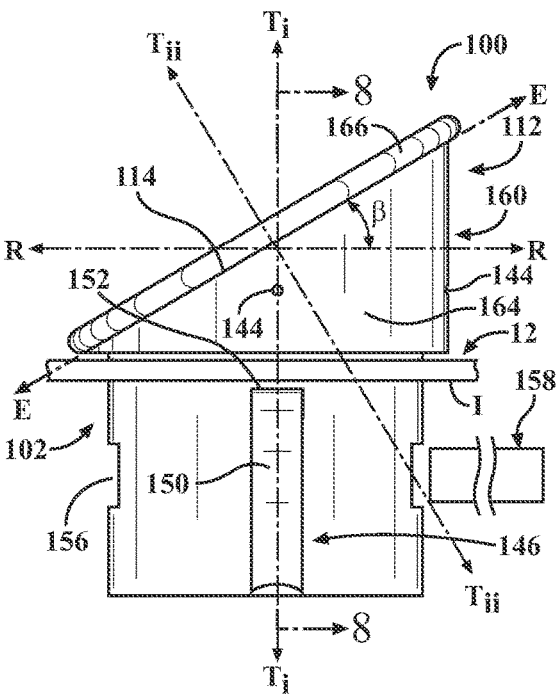
FIG. 6 is side, plan view of the sensor assembly seen in FIG. 4 upon installation.
Figure 7:
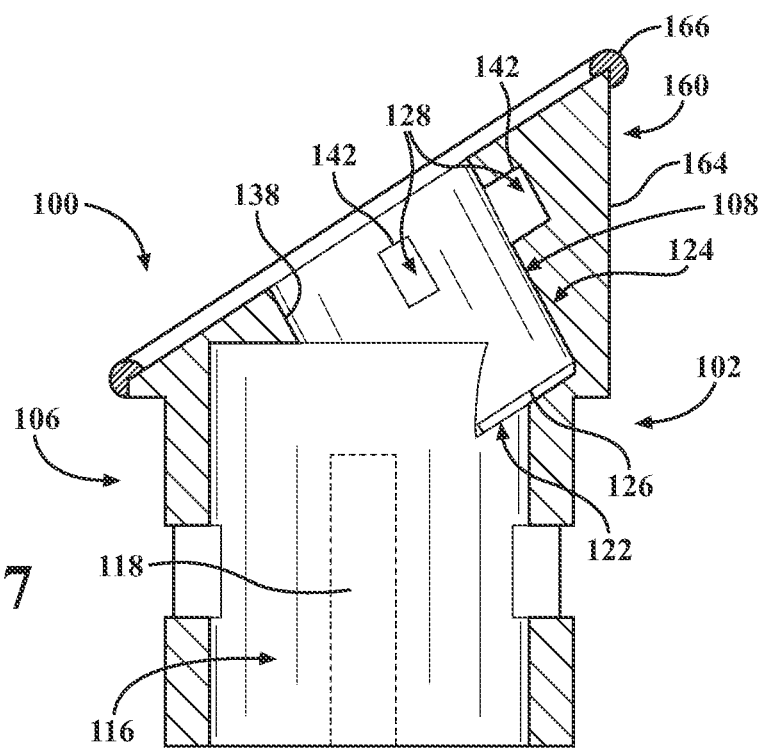
FIG. 7 is a partial, side, cross-sectional view of the sensor assembly taken along line 7-7 in FIG. 5.
Figure 8:
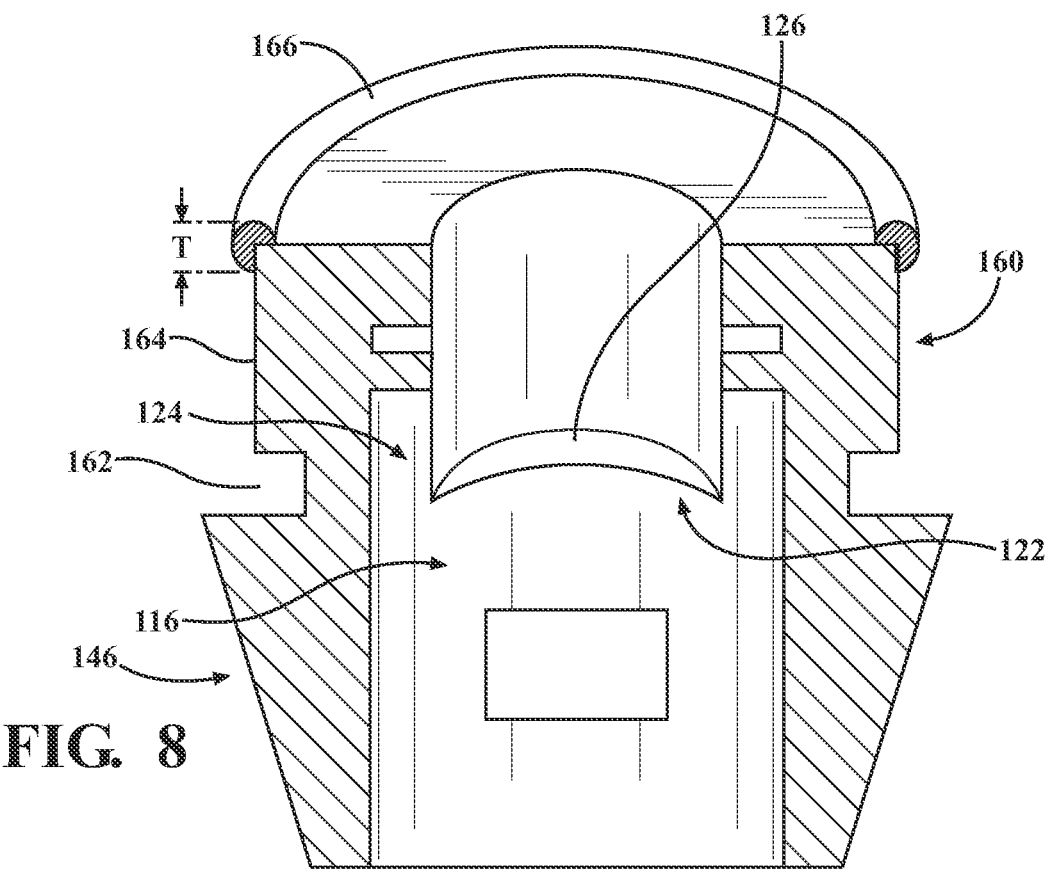
FIG. 8 is a partial, bottom, perspective, cross-sectional view of the sensor assembly taken along line 8-8 in FIG. 6.

As seen in FIGS. 5 and 6, for example, in the particular embodiment of the disclosure illustrated throughout the figures, each sensor assembly 100 includes one or more retaining members (anchors) 146 that extend laterally (e.g., radially) outward from the housing portion 102 in a similar or identical manner to the retaining member(s) 130 (FIG. 4) discussed above. For example, in the embodiment illustrated, the sensor assembly 100 is illustrated as including two retaining members 146 that are separated from each other by (approximately) 180° (e.g., such that the retaining members 146 are spaced (approximately) equidistant from each other). Embodiments in which the number and/or the location of the retaining members 146 may be varied are also contemplated herein, however, and would not be beyond the scope of the present disclosure.

In the particular embodiment of the disclosure illustrated throughout the figures, the retaining member(s) 146 are illustrated as tab(s) 148 that are resilient in construction, which allows for reconfiguration of the retaining member(s) 146 between an expanded (first, initial, normal) configuration and a compressed (second, subsequent) configuration. As discussed above in connection with the retaining member(s) 130 (FIG. 4), it is envisioned that resiliency of the retaining member(s) 146 may be achieved through the incorporation of one or more compressible materials (e.g., rubber materials, polymeric materials, elastomeric materials, etc.) and/or the incorporation of one or more compressible biasing members (e.g., springs or the like).

Upon the application of an external force, such as that applied during the insertion of the sensor assembl(ies) 100 into corresponding opening(s) O (FIG. 1) formed in the vehicle body 12 (e.g. the trunk lid 18), the retaining member(s) 146 are compressed (deflected inwardly) and move towards the axis Ti (FIG. 4). To facilitate inward deflection of the retaining member(s) 146, it is envisioned that the retaining member(s) 146 may include chamfered (angled) radial surfaces 150 that are configured for contact with the vehicle body 12 adjacent to the opening O. As the sensor assembl(ies) 100 are advanced through the opening(s) O, the chamfered radial surfaces 150 bear against the vehicle body 12, which causes compression (inward deflection) of the retaining member(s) 146.

Upon complete insertion of the sensor assembl(ies) 100 into the opening(s) 0, the resilient construction of the retaining member(s) 146 allows for outward movement of the retaining member(s) 146 (away from the axis Ti) towards the expanded configuration behind (inwardly of) the vehicle body 12. Upon (partial or complete) restoration of the expanded configuration, the retaining member(s) 146 secure the sensor assembl(ies) 100 within the opening(s) O (e.g., via contact between an upper surface 152 of each retaining member 146 and an inner surface I of the vehicle body 12).

To facilitate repair or replacement of the sensor assembly 100, it is envisioned that the sensor assembl(ies) 100 may be configured for removable insertion into the opening(s) O. In such embodiments, it is envisioned that the retaining member(s) 146 may be moved towards the compressed configuration via the application of a withdrawal force F2 (FIG. 3). To facilitate inward deflection of the retaining member(s)

146 during removal of the sensor assembl(ies) 100 from the opening(s) O, it is envisioned that the upper surface 152 of each retaining member 146 may be chamfered (angled) such that, during removal of the sensor assembl(ies) 100 from the opening(s) O, the upper surface(s) 152 bear against the inner surface I so as to causes compression (inward deflection) of the retaining member(s) 146. Additionally, or alternatively, it is envisioned that the retaining member(s) 146 may be accessed and manually compressed (deflected radially inward) by a technician.

In certain embodiments of the disclosure, such as that illustrated throughout the figures, it is envisioned that the housing portion 102 (e.g., the trunk 106) may include one or more openings 154 (e.g., through-holes 156) (FIGS. 5, 6) that are configured to receive a corresponding locking member 158, such as a rod, a clip, or any other such suitable structure or mechanism, to further secure each sensor assembly 100 in relation to the vehicle body 12. Following installation of the sensor assembl(ies) 100, the locking member(s) 158 are inserted into the opening(s) 154 such that they are obscured, concealed, or otherwise hidden from view by the vehicle body 12.

In such embodiments, it is envisioned that the locking member(s) 158 may be configured in any manner suitable for the intended purpose of engaging the housing portion 102 so as to inhibit (if not entirely prevent) unauthorized or undesired removal (e.g., theft) of the sensor assembl(ies) 100 from the vehicle 10. For example, it is envisioned that the locking (anti-theft) member(s) 158 may be keyed to the opening(s) 154, that the locking member(s) 158 may include one or more spring-biased (ball) detents, etc.

In the particular embodiment of the disclosure illustrated throughout the figures, each sensor assembly 100 further includes a collar 160 that is located (supported) adjacent to (at) the operative end 112 of the housing portion 102. The collar 160 extends from the end face 114 of the housing portion 102 towards the retaining member(s) 146 so as to define a receiving space 162 (FIGS. 5, 8) therebetween that is configured to receive the vehicle body 12 (FIG. 6) such that the vehicle body 12 is secured between the collar 160 and the retaining member(s) 146 upon complete insertion of the sensor assembly 100 into the opening O in the vehicle body 12.

In various embodiments of the disclosure, it is envisioned that the housing portion 102 and the collar 160 may be integrally (e.g., monolithically) formed or, alternatively, that the housing portion 102 and the collar 160 may be formed as separate, discrete components of the sensor assembly 100. In such embodiments, is envisioned that the housing portion 102 and the collar 160 may be fixedly or removably secured together (connected) in any suitable manner, such as, for example, through the use of an adhesive and/or one or more mechanical fasteners (e.g., screws, pins, rivets, clips, etc.).

The collar 160 includes a body (shroud) 164 that is generally cylindrical in configuration and a finishing ring 166. The collar 160 may include (e.g., may be formed partially or entirely from) any suitable material or combination of materials and may be formed through any suitable method of manufacture (e.g., injection molding, casting, laser machining, etc.). For example, it is envisioned that the collar 160 may include (e.g., may be formed partially or entirely from) one or more resilient and/or shock-absorbent materials to dampen vibration (e.g., to increase the accuracy and/or reliability of object detection).

As seen in FIG. 6, for example, the finishing ring 166 is arranged in (generally) parallel relation to the end face 114 of the housing portion 102 (and the axis E), whereby the finishing ring 166 also extends at the angle β in relation to the reference axis R. The finishing ring 166 defines a thickness T (FIG. 8) and extends outwardly from the body 164 of the collar 160 along both the axis Ti and the axis E, which not only obscures (e.g., conceals) the opening(s) O (FIG. 1) in the vehicle body 12, thereby improving the overall aesthetic appearance of the vehicle 10, but provides a barrier between the housing portion 102, the sensor 104, and an external object. In the event of contact with an external object, it is envisioned that the finishing ring 166 may absorb force that would otherwise be applied directly to the housing portion 102 and/or the sensor 104, thereby protecting the housing portion 102 and the sensor 104 and inhibiting (if not entirely preventing) any damage to the housing portion 102 and the sensor 104 that may occur in the absence of the finishing ring 166.

In certain alternate embodiments of the disclosure, it is envisioned that the collar 160 may be replaced by an O-ring (or other such suitable structure or member) or that the collar 160 may be omitted altogether (e.g., to reduce the overall cost of the sensor assembly 100).

With reference now to FIGS. 1 and 3-8, a method of installing one or more of the aforedescribed sensor assemblies 100 in the vehicle 10 will be discussed. During installation, each sensor assembly 100 is inserted into and advanced through one of the corresponding openings O (FIG. 1) in the vehicle body 12 (e.g., the trunk lid 18 at the rear end portion 14 of the vehicle 10). As the sensor assembl(ies) 100 are advance through the opening(s) O, the chamfered radial surface(s) 150 (FIGS. 5, 6) of the retaining member(s) 146 contact and bear against the vehicle body 12, which results in inward deflection of the retaining member(s) 146. Advancement of the sensor assembl(ies) 100 continues until the vehicle body 12 is received by the receiving space 162 (FIG. 5) defined between the retaining member(s) 146 and the collar 160 of each sensor assembly 100. Upon (or subsequent to) receipt of the vehicle body 12 within the receiving space 162, the retaining member(s) 146 expand behind the vehicle body 12 to thereby secure the vehicle body 12 between the retaining member(s) 146 and the collar 160, as seen in FIG. 6, for example.

During installation of the sensor assembl(ies) 100, it is envisioned that the body 164 of each collar 160 may be compressed against the vehicle body 12, thereby improving securement of the sensor assembl(ies) 100 in relation to the vehicle body 12 by inhibiting (if not entirely preventing) relative movement (rattle) between the sensor assembl(ies) 100 and the vehicle body 12.

The sensor assembl(ies) 100 are configured such that, upon installation, each sensor assembly 100 is supported on (connected to) the vehicle body 12 (within a corresponding opening O) such that the axis Ti (FIG. 4) defined by the trunk 106 of the housing portion 102 is oriented in (generally) parallel relation to the longitudinal axis Y (FIG. 3) of the vehicle body 12 and the axis Tii is oriented in transverse relation to both the axis Ti and the longitudinal axis Y. As a result, each sensor 104 is oriented such that the sensing axis X thereof is oriented in non-parallel relation to the longitudinal axis Y at the aforementioned (downward) angle α.

To facilitate proper installation of the sensor assembl(ies) 100 and orientation of the sensors 104, in certain embodiments, is envisioned that each sensor assembly 100 may include an indicator (installation guide) 168 (FIG. 5), which may include any suitable indicia (e.g., an arrow, a line, etc.) positioned in any suitable location, such as, for example, on the end face 114 of the housing portion 102, on the collar 160, etc. The indicator 168 guards against improper installation by providing a visual marker identifying the orientation required to angle the sensor 104 in the intended manner (e.g., towards the ground G).

Following proper installation of the sensor assembl(ies) 100, the locking member(s) 158 (FIG. 6) may be inserted into the opening(s) 154 in the housing portion 102 of each sensor assembly 100 to inhibit (if not entirely prevent) removal (e.g., theft) of the sensor assembl(ies) 100.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass variations on the order of 25% (e.g., to allow for manufacturing tolerances and/or deviations in design).

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
   a vehicle body; and
   at least one sensor assembly supported on the vehicle body and configured to detect an external object, the at least one sensor assembly including:
      a housing portion; and
      a sensor defining a central axis and supported within the housing portion such that the central axis of the sensor is oriented at a fixed, non-adjustable downward angle in relation to a longitudinal axis of the vehicle.

2. The vehicle of claim 1, wherein the at least one sensor assembly is supported on a rear end portion of the vehicle.

3. The vehicle of claim 2, wherein the vehicle further includes a rear bumper, the at least one sensor assembly being supported vertically above the rear bumper.

4. The vehicle of claim 2, wherein the vehicle further includes a rear bumper, the at least one sensor assembly being supported on the rear bumper.

5. The vehicle of claim 1, wherein the at least one sensor assembly is supported on the vehicle body such that the fixed, non-adjustable downward angle lies substantially within a range of approximately 15° to approximately 45°.

6. The vehicle of claim 5, wherein the at least one sensor assembly is supported on the vehicle body such that the fixed, non-adjustable downward angle is approximately 30°.

7. The vehicle of claim 1, wherein the at least one sensor assembly includes:
   a first sensor assembly spaced from a first lateral end of the vehicle; and
   a second sensor assembly spaced from a second lateral end of the vehicle.

8. The vehicle of claim 7, wherein the first sensor assembly is spaced a first distance from the first lateral end of the vehicle and the second sensor assembly is spaced a second distance from the second lateral end of the vehicle, the first distance and the second distance being approximately equivalent.

9. The vehicle of claim 7, wherein the at least one sensor assembly further includes:
   a third sensor assembly spaced between the first sensor assembly and the second sensor assembly; and
   a fourth sensor assembly spaced between the second sensor assembly and the third sensor assembly.

10. The vehicle of claim 1, wherein the at least one sensor assembly further includes:
    a retaining member extending laterally outward from the housing portion; and
    a collar supported adjacent to an end of the housing portion so as to define a receiving space between the retaining member and the collar configured to receive the vehicle body such that the vehicle body is located between the retaining member and the collar to thereby secure the at least one sensor assembly in relation to the vehicle body.

11. The vehicle of claim 10, wherein the at least one sensor assembly includes an indicator to facilitate proper orientation of the at least one sensor assembly in relation to the vehicle body during installation.

12. The vehicle of claim 10, wherein the housing portion defines an opening configured to receive a locking member to further secure the at least one sensor assembly in relation to the vehicle body.

13. A vehicle comprising:
a vehicle body; and
at least one sensor assembly supported on the vehicle body, the at least one sensor assembly including:
 a housing portion including:
  a trunk extending along a first axis; and
  a receptacle extending into the trunk along a second axis oriented at a fixed angle in relation to the first axis; and
 a sensor supported within the receptacle such that the sensor is oriented at a downward angle in relation to a length of the vehicle, the sensor being configured to detect an external object.

14. The vehicle of claim 13, wherein the receptacle extends into the trunk such that the fixed angle is approximately 30°.

15. The vehicle of claim 13, wherein the at least one sensor assembly includes a plurality of sensor assemblies spaced approximately equidistant from each other.

16. The vehicle of claim 13, wherein the at least one sensor assembly is supported on a rear end portion of the vehicle.

17. The vehicle of claim 13, wherein the at least one sensor assembly further includes:
a deflectable retention member extending laterally outward from the housing portion; and
a collar supported adjacent to an end of the housing portion such that the vehicle body is received between the deflectable retention member and the collar during installation of the at least one sensor assembly to thereby secure the at least one sensor assembly in relation to the vehicle body.

18. A vehicle comprising:
a vehicle body; and
at least one sensor assembly supported on the vehicle body, the at least one sensor assembly including:
 a housing portion defining a receptacle with one or more recesses; and
 a sensor supported within the receptacle such that the sensor is oriented at a downward angle in relation to a length of the vehicle, the sensor being configured to detect an external object and including one or more anchors positioned within the one or more recesses.

19. The vehicle of claim 18, wherein the one or more anchors are resilient in construction and reconfigurable between an expanded configuration, in which the one or more anchors are positioned within the one or more recesses to thereby secure the sensor within the receptacle, and a compressed configuration, in which the one or more anchors are deflected inwardly to allow for removal of the sensor from the receptacle.

20. The vehicle of claim 19, wherein the one or more anchors each include a chamfered surface configured for contact with the housing portion to facilitate reconfiguration of the one or more anchors from the expanded configuration into the compressed configuration during insertion of the sensor into the receptacle.

* * * * *